United States Patent [19]

Meyer et al.

[11] 3,847,707
[45] Nov. 12, 1974

[54] LAMINATING APPARATUS HAVING DUAL DOCTOR BLADE

[75] Inventors: Raymond W. Meyer, Tallmadge; Francis R. McGranghan, Stow; Dale K. Evans, Akron, all of Ohio

[73] Assignee: The General Tire & Rubber Company, Akron, Ohio

[22] Filed: Mar. 15, 1974

[21] Appl. No.: 451,637

Related U.S. Application Data

[62] Division of Ser. No. 287,186, Sept. 7, 1972.

[52] U.S. Cl................. 156/436, 118/103, 118/125, 118/405, 156/179, 156/441
[51] Int. Cl............................................. B65h 49/00
[58] Field of Search .......... 118/103, 122, 123, 125, 118/126; 156/463, 179, 180, 436, 443, 441, 518; 425/113, 114

[56] References Cited
UNITED STATES PATENTS 2,875,501  3/1959  Gravley........................... 156/180 X
3,589,960  6/1971  Hood et al...................... 156/180 X Primary Examiner—Morris Kaplan

[57] ABSTRACT

An improved sheet molding compound is provided having a greatly increased tensile strength in the direction of its longitudinal axis. The tensile strength increase results from the inclusion of a number of continuous glass fiber rovings. There is also disclosed a method for making the sheet molding compound and incorporating the continuous rovings between the top and bottom layers of resinous material. As part of the process, an improved doctor blade is provided which has a plurality of holes through which the continuous rovings are pulled after passing through a bath of the resinous material, thus causing the roving to be thoroughly impregnated with the resin.

9 Claims, 7 Drawing Figures

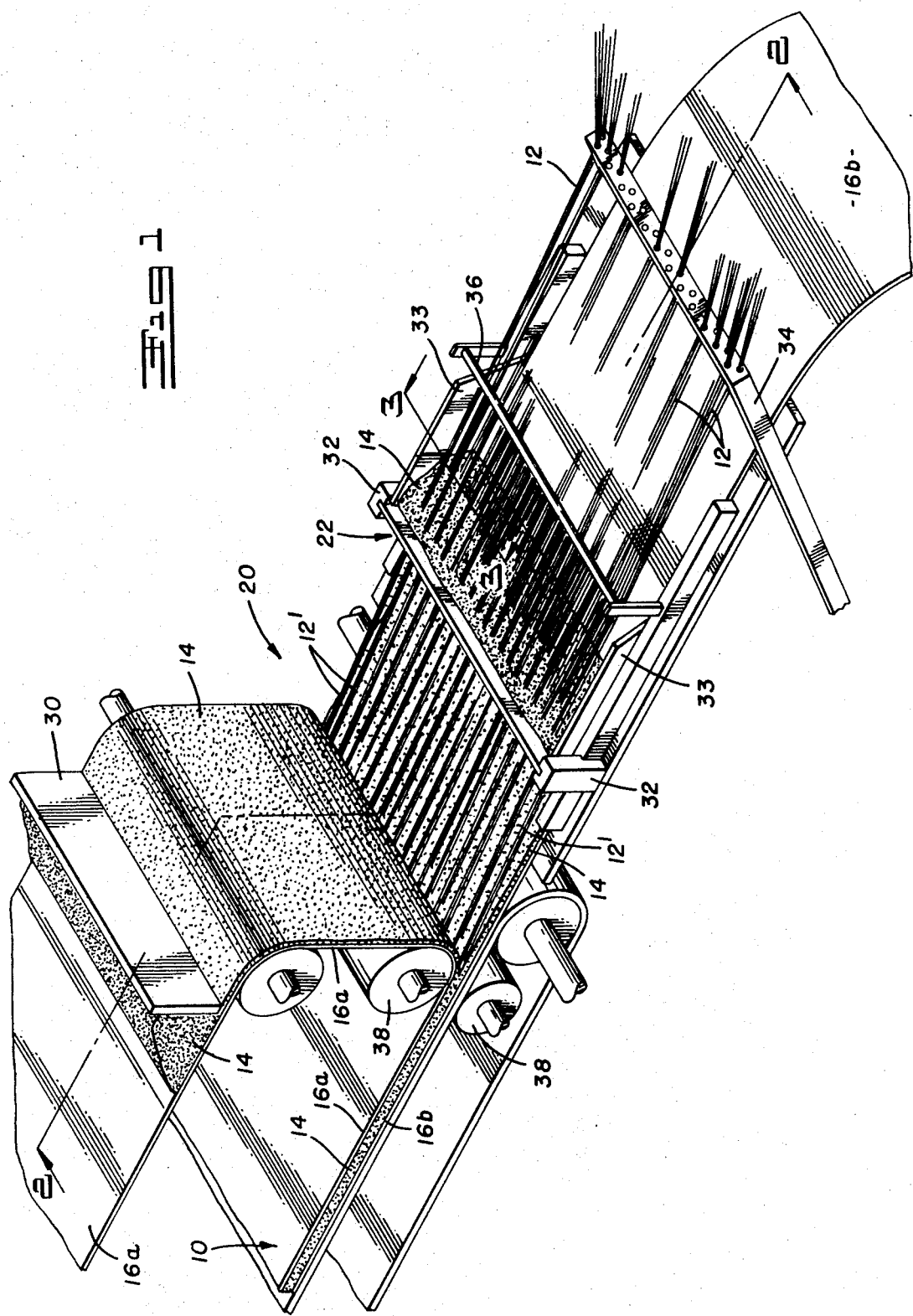

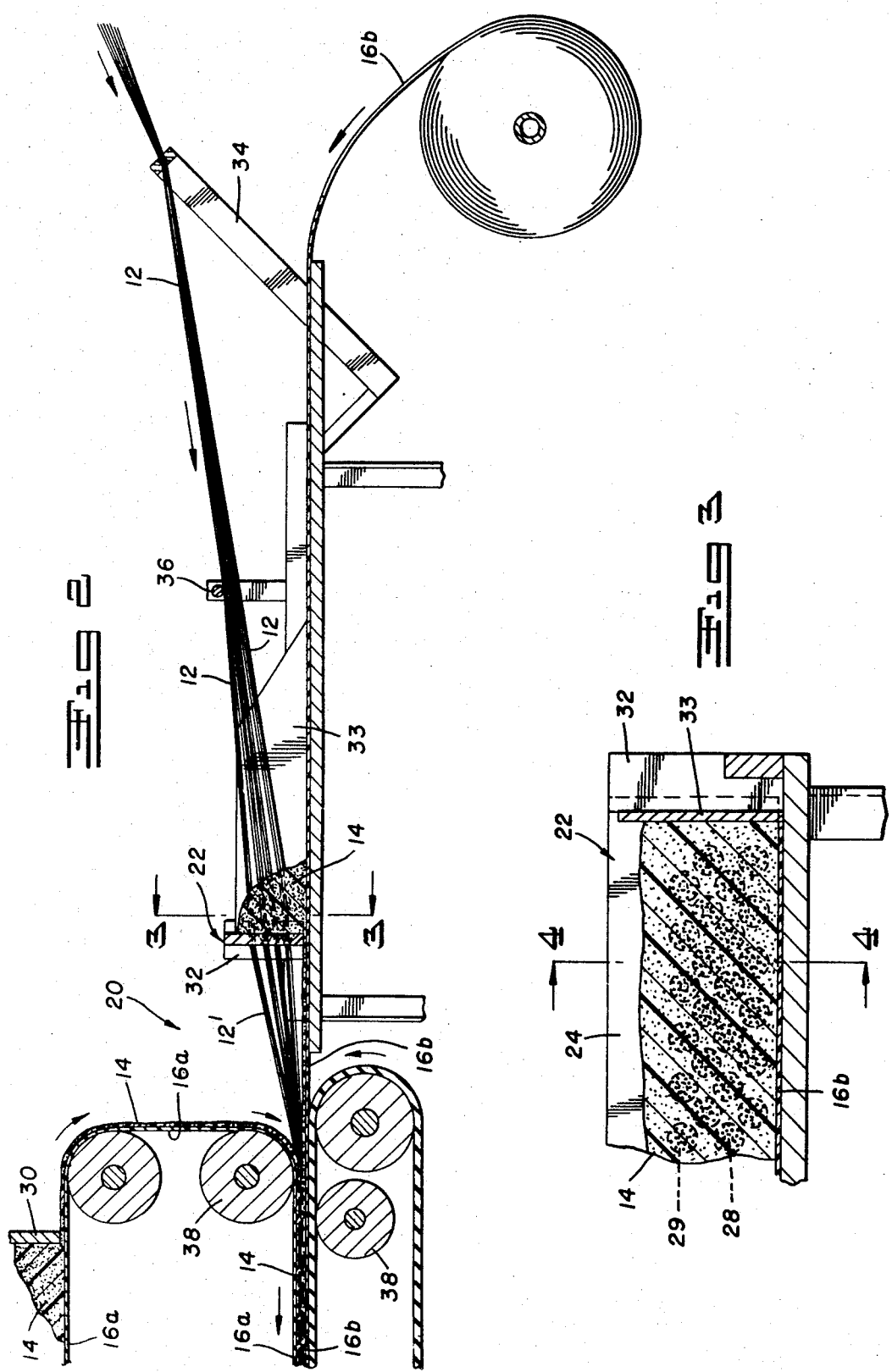

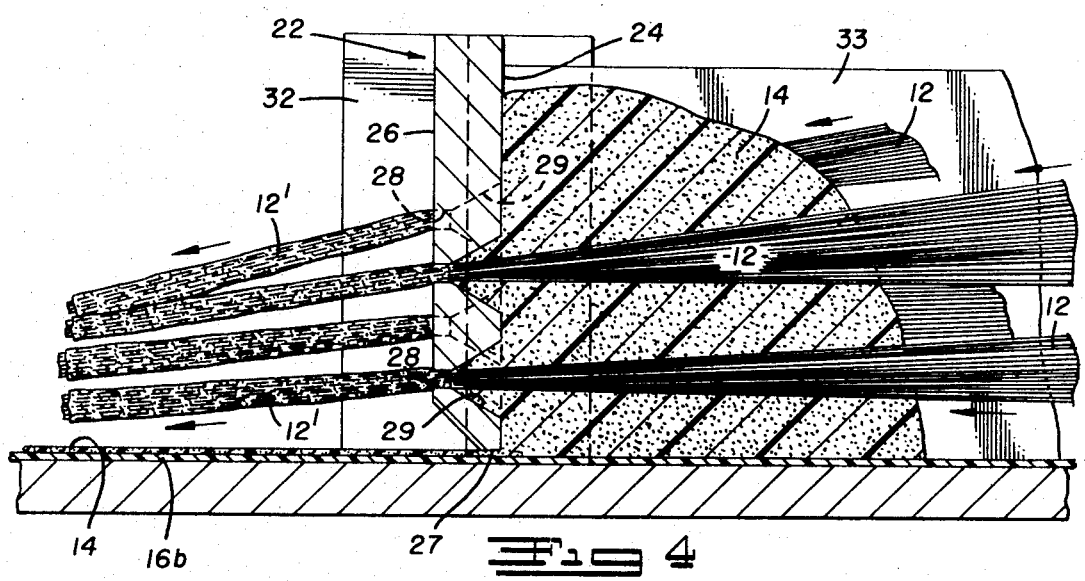
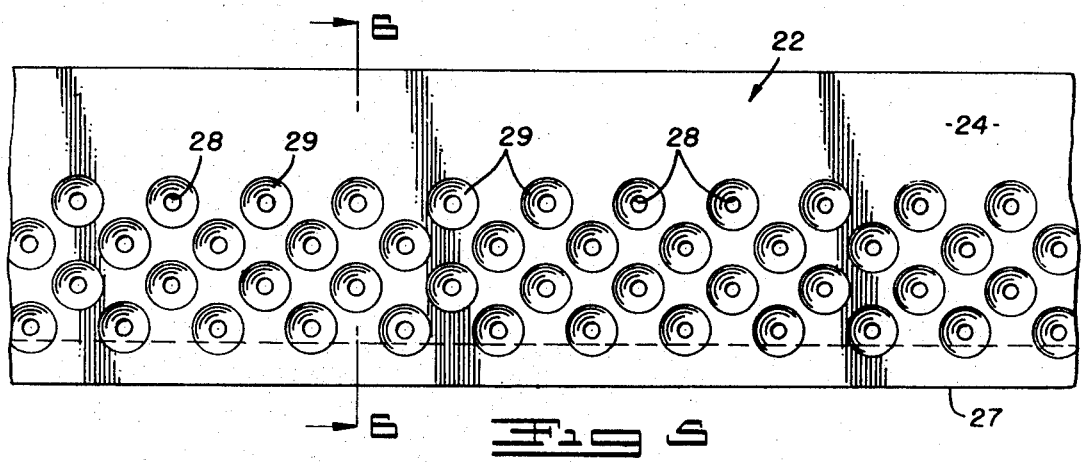
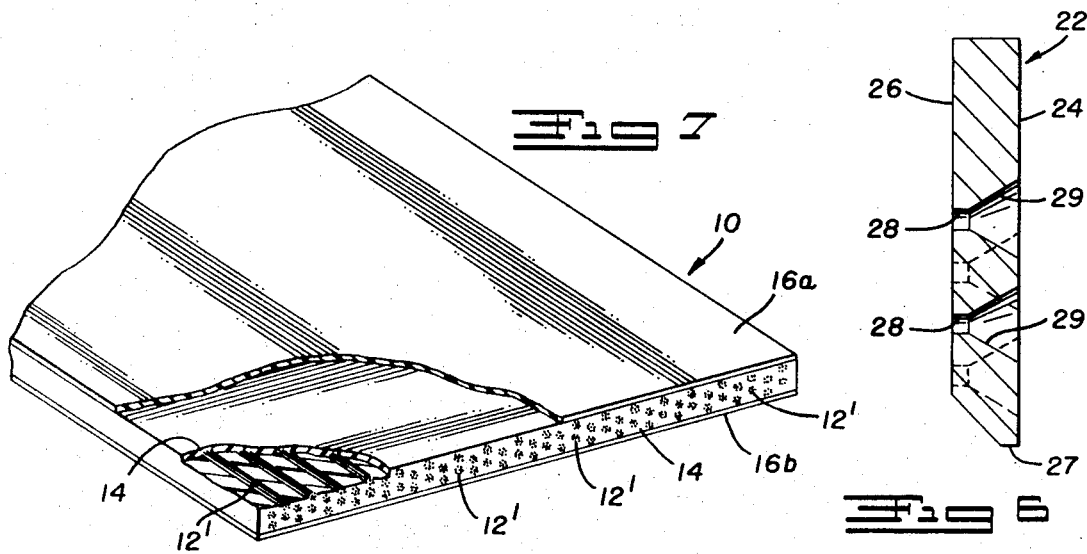

3,847,707

LAMINATING APPARATUS HAVING DUAL DOCTOR BLADE

This is a division, of application Ser. No. 287,186, filed Sept. 7, 1972.

BACKGROUND OF THE INVENTION

This invention relates to sheet molding compounds (SMC), and more particularly, to an SMC having continuous fibrous rovings and a substantially greater tensile strength in the direction in which the rovings are oriented.

Conventionally, SMC has been made by spreading a layer of resinous material, such as a polymeric resin, on a pair of plastic carrier sheets, then cutting a number of glass rovings into short strands and sprinkling the strands randomly on the bottom layer of resin just before the top layer of resin is joined thereto by means of a pair of rollers. The tensile strength of the resulting compound is uniform, i.e., approximately the same in all directions because of the random distribution of the reinforcing glass fibers.

The SMC would then normally be press-formed with matched-metal molds. It was found, however, that for many applications of the SMC the molded part would have weak points, frequently at a juncture where the charges of the compound would flow together during the press-forming. An example would be the forming of a rectangular box, such as a material handling tray, wherein the corners of the box would be weak and would tend to crack easily because of the way in which the SMC charges would flow together to form the corner.

In an attempt to make a stronger part, the prior art tried several solutions in which the strength of continuous glass rovings was utilized. In one attempt, continuous rovings were wound on a drum to form the reinforcement, and a cut was then made longitudinally, i.e., parallel to the axis of the drum, so that the reinforcement could be removed from the drum. While this method resulted in a stronger part when molded, an obvious limitation was that the part could be no longer than the circumference of the drum on which it was formed. In addition, unless the rovings were wound very tightly on the drum, they would tend to move laterally which resulted in gaps between the rovings and hence, weak spots in the molded part.

In an attempt to overcome the problems mentioned above, the prior art then prepared reinforcements by weaving the fiber glass rovings. While the woven reinforcing mat prevented the rovings from moving laterally, the weaving of the rovings was quite expensive and the individual rovings tended to be insufficiently wet-out, i.e., the rovings could not be as completely impregnated with the resin as is necessary to get maximum tensile strength from the roving. Unless the individual glass fibers in each roving are separated from each other by the resin, they will rub together, abrade and weaken, thus reducing the total strength of the roving.

Therefore, in use of the apparatus of the present invention, an improved sheet molding compound is provided which has a substantially higher tensile strength along its longitudinal axis. The compound comprises top and bottom layers of a resinous material and a plurality of fibrous rovings impregnated with resinous material and positioned between the top and bottom layers. The rovings are oriented to extend longitudinally of the sheet molding compound, thereby greatly increasing the tensile strength of the compound in that direction.

A method of using the apparatus of the invention involves the steps of:

a. providing a doctor blade having a plurality of orifices extending therethrough;
b. spreading a layer of resinous material on the carrier sheets;
c. continually pulling each of the continuous rovings through a bath of resinous material, then through one of the orifices of the doctor blade to impregnate the roving with the resin; and,
d. pressing the carrier sheets and layers of resin together with each of the rovings positioned between the layers of resin and extending longitudinally.

In accordance with a further aspect of the present invention an improved doctor blade is provided which is especially suited for use in making a continuous strand sheet molding compound and for practicing the method of making it. The doctor blade comprises an elongated blade member having end portions adapted to be fixedly mounted and including means for spreading a generally uniform layer of resinous material on a moving substrate. In addition, the blade member has at least one orifice having a longidudinal axis. The orifice is through the blade member so that a continuous bundle of fibers can be pulled through after having passed through a bath of resinous material. The orifice insures that the ratio of resinous material to fiber will be uniform throughout the length of each roving.

Accordingly, it is a primary object of the present invention to provide an apparatus for manufacturing a sheet molding compound having a greatly increased tensile strength in the direction of it longitudinal axis.

It is also an object of this invention to provide an apparatus for manufacturing a sheet molding compound which can be continuously produced without the necessity of expensive manual operations or complicated equipment such as is needed to weave rovings.

It is a further object of the present invention to provide an improved doctor blade for use in uniformly impregnating the continuous rovings.

These and other objects and advantages of the invention will become apparent from the following description when read in conjunction with the accompanying drawings wherein:

BRIEF DESCRIPTION OF THE DRAWINGS

FIG. 1 is a perspective of a sheet molding compound machine or impregnator that is used to make SMC in accordance with the method of the present invention.

FIG. 2 is a cross-section taken on line 2—2 of FIG. 1;

FIG. 3 is a cross-section taken on line 3—3 of FIG. 1 and FIG. 2;

FIG. 4 is a cross-section of the doctor blade taken on line 4—4 of FIG. 3;

FIG. 5 is a front elevation of the improved doctor blade;

FIG. 6 is another cross-section of doctor blade taken on line 6—6 of FIG. 5; and FIG. 7 is a fragmentary perspective of the improved sheet molding compound of the present invention.

DESCRIPTION OF THE PREFERRED EMBODIMENT

Referring now to the drawings which are for the purpose of illustrating preferred improvements of the present invention and not for the purpose of limiting the same, FIG. 7 shows the improved sheet molding compound 10 as it comes off the impregnator. The sheet molding compound 10 includes a plurality of continuous bundles 12 feet of fibrous rovings spaced apart in a mass of hardenable resinous material 14. The compound is formed between a pair of carrier sheets 16a and 16b which can be made of any thin flexible material such as polyethylene plastic sheet.

FIG. 1 shows a conventional sheet molding compound impregnator 20 which has been modified by the substitution of the improved doctor blade 22. In the conventional process for making sheet molding compound, the pair of carrier sheets 16a and 16b are in the position shown in FIGS. 1 and 2 and each are coated with a thin, uniform layer of the resinous material 14 by a pair of blades such as the conventional doctor blade 30. In the method of the present invention the conventional doctor blade 30 is used only to coat the top carrier sheet 16a, and the bottom carrier sheet 16b is coated by the improved doctor blade 22. The improved doctor blade can be held rigidly by any of the means commonly used to mount the conventional doctor blade, such as the holding blocks 32. Restraining means, such as wall members 33, should be employed to make it possible to keep a substantial mass of resin 14 in place behind the doctor blade.

As best can be seen in FIG. 6, the doctor blade 22 is an elongated member shown as having opposing flat surfaces 24 and 26 and a narrow bottom surface 27 which serves the purpose of spreading the resinous material 14 in a thin layer. The surface 27 is shown as being about 1/16 inch wide and extending the length of the blade 22. The surface 27 is further illustrated as being planar, but it should be understood that surface 27 may be of a different configuration for special applications. The doctor blade also includes a plurality of orifices which, in the preferred embodiment, comprise a cylindrical portion 28 and an incoming tapered portion 29, the function of which will be described in more detail subsequently.

Referring again to FIGS. 1 and 2, the rovings 12 are shown coming from their storage locations, and being guided through the holes in the first guide bar 34 and maintained in a generally horizontal orientation by the second guide bar 36. It is desirable that the rovings 12 enter the bath of resin 14 in a nearly horizontal position to minimize the drag and so that, after being pulled through the tapered portion 29 and cylindrical portion 28 of the doctor blade, the rovings will be uniformly impregnated with the resin. After passing through the doctor blade, the impregnated rovings 12' then are positioned between the coated carrier sheets 16a, 16b and the composite of the carrier sheets, layers of resin and impregnated rovings are pressed together by the pair of rollers 38.

The improved sheet molding compound of the present invention provides for the first time an SMC which takes full advantage of the greater tensile strength of the fiber materials used to reinforce such compounds. The fibrous rovings may be selected from a variety of fiber material, however, glass fiber rovings are preferred for most applications because of the extremely high tensile strength of the individual glass fiber, typically in the range of 500,000 to 750,000 p.s.i. *The glass fibers are also compatible with any of the commonly used resinous material and are generally considered chemically inert. It is within the scope of the present invention, however, to use other fiber material for the rovings, such as sisal and hemp fibers, as well as asbestos, graphite, boron, and other metal fibers. Another group of materials commonly used for rovings include the fibers of wool, cotton, polyester and nylon. The rovings are preferably made from a plurality of the continuous fibers, primarily because of the safety feature provided by having a large number of fibers, so that if one breaks, the load is simply transferred to the remaining fibers in the bundle. In the preferred embodiment of the present invention, the rovings comprise bundles of at least about* 25 continuous glass fibers and preferably as many as 50 separate fibers. It has been discovered that by the use of continuous bundles of fibers rather than the randomly distributed short strands of the prior art, the longitudinal tensile strength of the resulting SMC can be increased to as much as twice that of the conventional SMC. If the part to be formed from the SMC requires greater tensile strength in more than just one direction, it is possible to place one charge of the continuous strand SMC on top of another, in the press, with the plurality of charges of SMC oriented at angles to each other, i.e., with the continuous rovings of the charges oriented at different angles. It can be readily appreciated that the SMC of the present invention thereby affords a greater degree of freedom in the design of parts to be made from SMC.

The proportion of fiber rovings to resin mixture can vary greatly with only a small number of continuous rovings being used if only a small increase in longitudinal tensile strength is needed. It was found, however, that an SMC having about 50 p.b.w. of continuous fibrous rovings and about 50 p.b.w. of resinous mixture yields optimum results in terms of maximum tensile strength without a failure to properly impregnate and protect the rovings. Nearly optimum results can be achieved by keeping both the rovings and the resinous mixture within a range of 40–60 p.b.w.

The importance of the improved doctor blade can be readily appreciated if the necessity for properly impregnating the rovings is understood. As can best be seen in FIG. 4, as the individual rovings 12 proceed through the bath of resin 14, and then through the doctor blade, some of the resinous material is pulled into the tapered portion 29. This excess resin is then wiped off the moving roving as it proceeds through cylindrical portion 28. The most important part of the impregnating step is to provide a means whereby the resin is forced in among the individual fibers of the roving, so that the resin serves to separate the individual fibers from each other, thus preventing them from abrading each other and eventually breaking. In the past it has been difficult to impregnate continuous rovings with heavily filled mixes sufficiently to obtain the maximum benefit from the greater strength inherent in a continuous roving. The doctor blade of the present invention now makes it feasible to simultaneously and continuously impregnate any desired number of rovings up to 50 or more.

In the preferred embodiment of the doctor blade, the orifices are arranged in four parallel rows, each row horizontally off-set or staggered from the adjacent rows. After the impregnated rovings are pulled through the doctor blade, however, they do not remain in the multilayer arrangement, but are all within one layer. The individual orifices are made by drilling a hole starting at surface 24 perpendicularly through the blade, thus creating cylindrical portion 28. Next, tapered portion 29 is made by counterboring or milling to give an included angle of approximately 50°. A typical diameter for cylindrical portion 28 would be approximately 0.090 inch, which is just slightly larger than the diameter of the roving before impregnation. In the subject embodiment, the orifices in each row are on a center-to-center separation of about seven-eighths of an inch and the adjacent rows are separated horizontally by about three-eighths of an inch. It will be readily apparent that the configuration of the doctor blade or its dimensions could vary significantly from those just described and still be within the scope of the present invention, as long as the doctor blade and its orifices serve the dual function of aligning the rovings and uniformly impregnating each of the roving over its entire length.

The resinous material used in making the sheet molding compound of the present invention can be selected from any of those used in making a conventional SMC. Typical resins used would include polyester, phenolic, epoxy, silicone, alkyd, acrylic and polyethylene. However, the thermosetting resins are predominantly used, and the thermoset used most frequently in applications requiring greater tensile strength in continuous strand SMC are the polyester resins. For some applications it may be desirable to use a thermosetting resin such as polyester as the base material and include a thermoplastic resin to improve the surface finish. In making the SMC, whether the conventional or the continuous strand, it is desirable to include in the resinous mixture a thickener, such as a Group II metal oxide, preferably magnesium oxide or calcium oxide. In the preferred embodiment (50 p.b.w. resin mixture and 50 p.b.w. rovings) the resin mixture contained 110 parts of filler to 100 parts of the polyester resin. If the p.b.w. of the glass rovings is increased, the proportion of filler in the resin mixture should be reduced proportionately so as not to reduce too greatly the overall p.b.w. of the polyester or other resin.

In converting the conventional impregnator for making sheet molding compounds to one for the ocntinuous strand SMC, the modified doctor blade should normally be put at a lower setting, i.e., closer to the carrier sheet, than a conventional doctor blade, since resin mix is also being added to the composite by means of the impregnated rovings. Therefore, the lower doctor blade setting will yield a thinner layer of resin mix on the bottom carrier sheet and the end result will be an SMC having the same proportions of fiber reinforcement and resin mix as in the conventional SMC. A typical adjustment on the setting of the modified doctor blade would be approximately 0.010 of an inch below the conventional setting which has normally been in the range of 0.040 inch to 0.060 inch. A modification of the SMC which improves the tensile strength of the resulting material in a direction transverse to the orientation of the continuous rovings can be accomplished by diverting one or more of the continuous rovings to a chopping station located down-stream from the modified doctor blade. The chopping of the roving can be done in the same manner as was done for making the conventional SMC. The short strands, generally about one to two inches long, are than allowed to fall randomly on the combination of the bottom layer of resin and the impregnated continuous rovings, just before the top layer of resin is combined therewith, and pressed into a sheet. For the optimum results described previously in conjuction with the preferred embodiment, where the SMC had 50 p.b.w. rovings, the proportion of the shorter strands to the continuous strands should not exceed about 30 percent.

It will be understood by those familiar with the art that many modifications and alternatives can be made in the apparatus, method and material of the present invention. Accordingly, it is intended that the foregoing specification embrace all such alternatives and modifications as fall within the spirit of the appended claims.

What is claimed is:
1. In a laminating apparatus the improvement comprising:
 a. a horizontally arranged table support;
 b. means to feed continuous sheet across said table;
 c. a vertically disposed doctor blade in operative association with said table and supported by sidewall members whereby said blade, walls, substrate and table form a trough for containing a resin material to be coated onto said moving sheet and the bottom edge of said blade doctors said coating;
 d. said blade having at least one orifice extending through an intermediate portion thereof and below the level of said resin; and
 e. means feeding a plurality of continuous fibers through said resin and subsequently through said at least one orifice whereby to produce a continuous length of substantially uniformly coated and formed bundle of fibers.

2. The apparatus of claim 1 wherein said orifice has a generally circular cross-section over at least a portion of the distance along its longitudinal axis.

3. The apparatus of claim 1 wherein said orifice comprises a first portion and a second portion, said second portion is generally cylindrical, said first portion has a larger diameter than said second portion, and said portions are arranged such that said bundle of fibers enters said first portion, then proceeds through said second portion.

4. The apparatus of claim 3 wherein said second portion has a diameter between about 0.050 inch and about 0.150 inch and said second portion is a counterbore which defines an included angle of between about 30° and about 90°.

5. The apparatus of claim 3 wherein said counterbore extends to a depth equal to between about one-fourth and about three-fourths of the separation between said parallel surfaces.

6. The apparatus of claim 1 including a plurality of orifices, wherein said orifices are arranged in more than one row, and each of said rows are oriented substantially parallel to said resin-spreading means.

7. The apparatus of claim 6 wherein said rows of orifices are arranged in a staggered pattern; such that each orifice is horizontally offset from the nearest pair of orifices in each of the adjacent rows.

8. The apparatus of claim 6 wherein said longitudinal axes of adjacent orifices in the same row are separated by between about ½ inch and about 1 inch.

9. The apparatus of claim 6 wherein planes formed by said longitudinal axes in adjacent rows are separated by between about one-quarter of an inch and about three-quarters of an inch.

* * * * *

PO-1050
(5/69)

UNITED STATES PATENT OFFICE
CERTIFICATE OF CORRECTION

Patent No. 3,847,707    Dated November 12, 1974

Inventor(s) Raymond W. Meyer, Francis R. McGranaghan, Dale K. Evans

It is certified that error appears in the above-identified patent and that said Letters Patent are hereby corrected as shown below:

First page, Section 75, which reads "Francis R. McGranghan" should read ---Francis R. McGranaghan---.

Column 3, line 10, which reads "12 feet" should read ---12'---.

Column 5, line 48, which reads "ocntinuous" should read ---continuous---.

Signed and sealed this 14th day of January 1975.

(SEAL)
Attest:

McCOY M. GIBSON JR.
Attesting Officer

C. MARSHALL DANN
Commissioner of Patents